United States Patent
Kou et al.

(10) Patent No.: US 10,793,362 B2
(45) Date of Patent: Oct. 6, 2020

(54) RUBBER BELT RETRACTING AND DEPLOYING DEVICE FOR BELT CONVEYOR

(71) Applicant: TAIYUAN UNIVERSITY OF TECHNOLOGY, Taiyuan (CN)

(72) Inventors: Ziming Kou, Taiyuan (CN); Juan Wu, Taiyuan (CN); Guijun Gao, Taiyuan (CN); Jing Zhang, Taiyuan (CN); Jiabao Xue, Taiyuan (CN); Dingkui Tian, Taiyuan (CN)

(73) Assignee: TAIYUAN UNIVERSITY OF TECHNOLOGY, Taiyuan, Shanxi (CN)

( * ) Notice: Subject to any disclaimer, the term of this patent is extended or adjusted under 35 U.S.C. 154(b) by 0 days.

(21) Appl. No.: 15/755,547

(22) PCT Filed: Jan. 13, 2017

(86) PCT No.: PCT/CN2017/071187
§ 371 (c)(1),
(2) Date: Feb. 26, 2018

(87) PCT Pub. No.: WO2018/126492
PCT Pub. Date: Jul. 12, 2018

(65) Prior Publication Data
US 2020/0223638 A1    Jul. 16, 2020

(30) Foreign Application Priority Data
Jan. 9, 2017 (CN) .......................... 2017 1 0015116

(51) Int. Cl.
*B65G 15/12* (2006.01)
*B65G 15/32* (2006.01)
(Continued)

(52) U.S. Cl.
CPC ............. *B65G 15/32* (2013.01); *B65H 20/06* (2013.01); *B65G 23/04* (2013.01); *B65G 2812/02138* (2013.01); *B65H 2404/261* (2013.01)

(58) Field of Classification Search
CPC ........ B65G 15/12; B65G 21/10; B65G 21/26; B65H 20/06; B65H 20/08; B65H 21/00; B65H 21/02
(Continued)

(56) References Cited

U.S. PATENT DOCUMENTS 2,868,356 A * 1/1959 Haaff ........................ F16H 7/06
                                                        198/833
3,330,410 A * 7/1967 Kirk .......................... A23N 4/12
                                                        209/692
(Continued)

FOREIGN PATENT DOCUMENTS

CN          1174163 A       2/1998
CN       201605022 U       10/2010
(Continued)

OTHER PUBLICATIONS

International Search Report in international application No. PCT/CN2017/071187, dated Oct. 12, 2017.

*Primary Examiner* — Joseph A Dillon, Jr.
(74) *Attorney, Agent, or Firm* — Syncoda LLC; Feng Ma (57) ABSTRACT

A rubber belt retracting and deploying device for a belt conveyor includes a base, mounting frames, an upper caterpillar disk, a middle caterpillar disk and a lower caterpillar disk, wherein the lower caterpillar disk is fixedly connected between the symmetric mounting frames, and the middle caterpillar disk is movably connected between the symmetric mounting frames, and may longitudinally slide along the symmetric mounting, frames, such that the lower caterpillar disk and the middle caterpillar disk form a first clamping
(Continued)

device; the upper caterpillar disk is movably connected between the symmetric mounting frames, and may longitudinally slide along the symmetric mounting frames, such that the upper caterpillar disk and the middle caterpillar disk form a second clamping device; each of the upper caterpillar disk, the middle caterpillar disk and the lower caterpillar disk is provided with a driving part.

9 Claims, 7 Drawing Sheets

(51) Int. Cl.
*B65H 20/06* (2006.01)
*B65G 23/04* (2006.01)

(58) Field of Classification Search
USPC .................................. 198/603, 817, 853
See application file for complete search history.

(56) References Cited

U.S. PATENT DOCUMENTS

| | | | | |
|---|---|---|---|---|
| 3,369,649 | A * | 2/1968 | Schilling, Jr. .......... | B65G 23/14 198/683 |
| 3,850,213 | A * | 11/1974 | Keaton .................... | B27D 3/04 100/154 |
| 4,267,930 | A * | 5/1981 | Melkonian .............. | B07B 13/10 209/3.1 |
| 4,526,638 | A * | 7/1985 | Clements ............ | B29C 65/5042 156/159 |
| 4,892,647 | A * | 1/1990 | Liddle ...................... | B03B 1/02 198/603 |
| 5,238,165 | A * | 8/1993 | Groblacher ............ | B65G 15/14 226/172 |
| 5,368,643 | A * | 11/1994 | Kuster .................... | B05C 5/004 118/324 |
| 5,437,749 | A * | 8/1995 | Pipkorn ................ | B65H 21/00 156/64 |
| 6,133,549 | A * | 10/2000 | Shih ...................... | C21D 9/0018 198/844.1 |
| 6,276,519 | B1 * | 8/2001 | Craft ...................... | F15B 11/003 198/813 |
| 7,434,678 | B1 * | 10/2008 | Kitazumi ............... | B65G 15/02 198/465.3 |
| 8,141,694 | B2 * | 3/2012 | Krallinger ................ | B27F 1/06 198/345.1 |
| 2002/0000457 | A1 * | 1/2002 | Crowley .............. | B41J 11/0005 226/31 |
| 2004/0262131 | A1 * | 12/2004 | Forster .................... | F16H 7/18 198/805 |
| 2007/0267276 | A1 * | 11/2007 | Kudrus .................... | B21C 1/30 198/817 |
| 2011/0120836 | A1 * | 5/2011 | Jenkins ................. | B65G 15/14 198/604 |
| 2012/0211538 | A1 * | 8/2012 | Yamamoto ........ | A61F 13/15764 226/95 |
| 2017/0361520 | A1 * | 12/2017 | Jackson ............... | B65G 17/326 |
| 2018/0099321 | A1 * | 4/2018 | Hashikawa ............. | B21C 47/26 |

FOREIGN PATENT DOCUMENTS

| | | |
|---|---|---|
| CN | 202358736 U | 8/2012 |
| CN | 103009037 A | 4/2013 |
| CN | 103966715 A | 8/2014 |
| CN | 104003230 A | 8/2014 |
| CN | 104016168 A | 9/2014 |
| CN | 104129666 A | 11/2014 |
| CN | 205500426 U | 8/2016 |
| DE | 102004060971 A1 | 6/2006 |
| JP | H101242358 A | 9/1989 |

* cited by examiner

RUBBER BELT RETRACTING AND DEPLOYING DEVICE FOR BELT CONVEYOR

CROSS-REFERENCE TO RELATED APPLICATIONS

The present application claims benefit of Chinese Patent Application 201710015116.6, filed on Jan. 9, 2017, the contents of which are hereby incorporated by reference in its entirety.

TECHNICAL FIELD

The disclosure relates to coal production equipment, and particularly to a rubber belt retracting and deploying device for a belt conveyor.

BACKGROUND

Belt conveyor is important large-sized equipment for coal production, plays an irreplaceable role in coal production, and is quite important for implementing transfer of coal from a working face to the ground. A rubber belt is a carrier carrying and transporting the coal. However, in a long-term using process of the rubber belt, the friction between a belt surface and a material and between the rubber belt and a drum will cause scratches to the belt surface of the rubber belt, and even corrosion, breakage and the like of a steel wire rope, which may lead to safety implications on operation of the rubber belt. Therefore, for ensuring safe and stable operation of the rubber belt, the rubber belt is required to be periodically replaced. As the continuous increase of a coal transportation volume, size and weight of the rubber belt are also correspondingly increased, and in addition, an ambient condition of belt conveyor equipment is complex, the replacement of the rubber belt thus is very complex and arduous.

Figure 1:
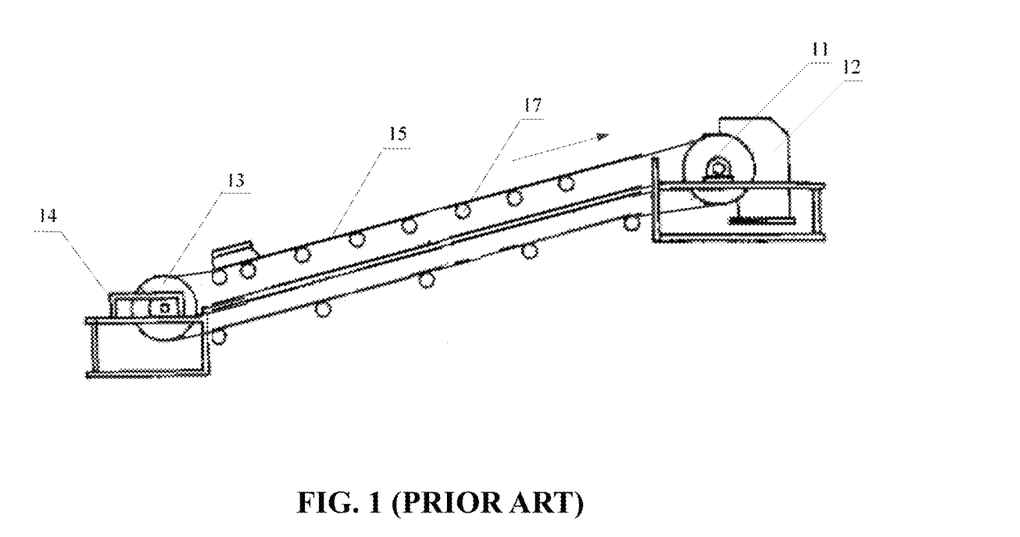
FIG. 1 is a structure diagram of a belt conveyor for coal production according to the prior art.

Generally, a work condition of a belt conveyor during coal production is shown in FIG. 1. A transmission drum 11 and a discharging device 12 are positioned on the ground, a redirection drum 13 and a charging device 14 are positioned on a working face which is usually lower than the ground. Coal is filled into the charging device 14, and then the coal is conveyed to the discharging device 12 along with rolling of a rubber belt 15, so that the coal is conveyed from the working face to the ground. For improving a bearing capacity of the rubber belt 15, a plurality of support rollers 17 may usually be arranged at a bottom of the rubber belt 15. In practice, as for the belt conveyor for coal production, no or a small number of support rollers 17 are arranged at a position close to the transmission drum 11.

In patent document CN104016168A named "belt replacement method for rubber belt retracting and deploying device of belt conveyor", the method is recited as follows: after the belt conveyor is stopped, a rubber belt is cut off, one end of the rubber belt is connected to a new rubber belt, the other end passes through a clearance between an upper caterpillar plate and lower caterpillar disk of the rubber belt retracting and deploying device; a hydraulic pump station is activated, and a hydraulic oil cylinder is driven to press the upper caterpillar disk towards the lower caterpillar disk to tightly press against the rubber belt; and then, a hydraulic motor is activated to drive caterpillar tracks to roll, so as to drive the rubber belt to move, the rubber belt cooperates with a belt winder to wind the rubber belt and gradually lay the new rubber belt at the same time.

In said patent document, as the rubber belt retracting and deploying device tightly press against the rubber belt on only one side, the whole rubber belt is in a loose state and may be closely abutted to support rollers under the action of gravity, and the rubber belt between two support rollers is in a pulled-down state, so that a frictional force is strengthened, and energy resources are wasted. As shown in FIG. 1, the conveyor used for coal production is usually in state that one end of the conveyor is higher and the other end is lower. In a belt replacement process, when the rubber belt on one side moves downwards, the rubber belt on this side may move downwards more easily by virtue of the gravity of the rubber belt. In said patent document, the rubber belt is in the loose state, and the gravity of the rubber belt may not be fully utilized, so that energy resources are wasted.

Therefore, there is an urgent need for a rubber belt retracting and deploying device suitable for coal production and capable of saving energy resources.

SUMMARY

In view of this, embodiments of the disclosure are expected to provide a rubber belt retracting and deploying device for a belt conveyor, which is applied to coal production and may save energy resources.

In order to achieve the purpose, the technical solutions of the disclosure are implemented as follows.

The embodiments of the disclosure provide a rubber belt retracting and deploying device for a belt conveyor, which includes a base, mounting frames, an upper caterpillar disk, a middle caterpillar disk and a lower caterpillar disk, wherein:

the mounting frames are symmetrically fixed on two sides of the base; the upper caterpillar disk, the middle caterpillar disk and the lower caterpillar disk are all transversely arranged between the symmetric mounting frames, and are symmetrically distributed in vertical direction;

the lower caterpillar disk is fixedly connected between the symmetric mounting frames, and the middle caterpillar disk is movably connected between the symmetric mounting frames and longitudinally slide along the symmetric mounting frames under a breaking of a first braking device, so that the lower caterpillar disk and the middle caterpillar disk form a first clamping device configured to clamp a rubber belt; the upper caterpillar disk is movably connected between the symmetric mounting frames and longitudinally slide along the symmetric mounting frames under a breaking of a second braking device, so that the upper caterpillar disk and the middle caterpillar disk form a second clamping device configured to clamp the rubber belt; and each of the upper caterpillar disk, the middle caterpillar disk and the lower caterpillar disk is provided with a driving part configured to drive a caterpillar track into rolling.

In the embodiment, horizontal support posts are fixed on both sides of the upper caterpillar disk, and the mounting frames are longitudinally provided with upper sliding slots accommodating the support posts of the upper caterpillar disk; horizontal support posts are fixed on both sides of the middle caterpillar disk, and the mounting frames are longitudinally provided with middle sliding slots accommodating the support posts of the middle caterpillar disk; and the upper sliding slots and the middle sliding slots are symmetrically distributed in vertical direction.

In the embodiment, horizontal support posts are fixed on both sides of the lower caterpillar disk, the mounting frames are provided with positioning holes through which the support posts of the lower caterpillar disk pass, the support posts are fixed in the positioning holes through bolts, and the positioning holes and the middle sliding slots are symmetrically distributed in vertical direction.

In the embodiment, the first braking device is a hydraulic oil cylinder, piston rod of the hydraulic oil cylinder is connected to the support post of the lower caterpillar disk, and cylinder barrel of the hydraulic oil cylinder is connected to the support post of the middle caterpillar disk.

In the embodiment, the second braking device is a hydraulic oil cylinder, piston rod of the hydraulic oil cylinders is connected to the support post of the upper caterpillar disk, and cylinder barrel of the hydraulic oil cylinder is connected to the support post of the middle caterpillar disk.

In the embodiment, a lower portion of the upper caterpillar disk is provided with bearing wheels, both an upper portion and lower portion of the middle caterpillar disk are also provided with bearing wheels, and an upper portion of the lower caterpillar disk is also provided with bearing wheels.

In the embodiment, the driving parts driving the caterpillar tracks into rolling are hydraulic motors.

In the embodiment, the base includes a short support leg engaging piece, a long support leg engaging piece and support pieces;

a first end of the short support leg engaging piece and a first end of the long support leg engaging piece are connected to each other through a pin shaft, and the third support piece configured to fix the mounting frames is mounted at a joint; a second end of the short support leg engaging piece is connected with a first grounding support seat through a pin shaft, and a second end of the long support leg engaging piece is connected with a second grounding support seat through a pin shaft;

the short support leg engaging piece is connected to one end of a first hydraulic oil cylinder through a pin shaft, and the other end of the first hydraulic oil cylinder is connected with the first support piece configured to fix the mounting frames through a pin shaft; and the long support leg engaging piece is connected to one end of a second hydraulic oil cylinder through a pin shaft, and the other end of the second hydraulic oil cylinder is connected with the second support piece configured to fix the mounting frames through a pin shaft.

The embodiments of the disclosure provide the rubber belt retracting and deploying device for the belt conveyor, which includes the upper caterpillar disk, the middle caterpillar disk and the lower caterpillar disk, wherein the lower caterpillar disk and the middle caterpillar disk form the first clamping device configured to clamp the rubber belt; the upper caterpillar disk and the middle caterpillar disk form the second clamping device configured to clamp the rubber belt; and each of the upper caterpillar disk, the middle caterpillar disk and the lower caterpillar disk is provided with the driving part driving the caterpillar track into rolling. During use, two ends of the rubber belt pass through the first clamping device and the second clamping device respectively, one clamping device is controlled to clamp one end of the rubber belt, the driving parts on the clamping device are activated to rotate the clamping device to tighten the rubber belt, and then the other clamping device is controlled to clamp the other end of the rubber belt. In such a manner, in a belt replacement process, the rubber belt may be in a tightened state, and may not be closely abutted to support rollers, and the rubber belt between two support rollers is prevented from a pulled-down state, so that a frictional force may be reduced. Furthermore, with reduction of the frictional force, the rubber belt may move more easily, and the gravity of part of the rubber belt moving downwards may counteract the gravity of part of rubber belt moving upwards, so that the rubber belt retracting and deploying device of the embodiments of the disclosure is only required to overcome the frictional force to complete rubber belt. Thus, the rubber belt retracting and deploying device of the embodiments of the disclosure may significantly save energy resources.

DETAILED DESCRIPTION

The embodiments of the disclosure provide a rubber belt retracting and deploying device for a belt conveyor. As shown in FIGS. 2-6, the rubber belt retracting and deploying device includes a base 3, mounting frames 4, an upper caterpillar disk 21, a middle caterpillar disk 22 and a lower caterpillar disk 23.

The mounting frames 4 are symmetrically fixed on two sides of the base 3; and all of the upper caterpillar disk 21, the middle caterpillar disk 22 and the lower caterpillar disk 23 are transversely arranged between the symmetric mounting frames 4, and are symmetrically distributed in vertical direction.

In practice, there may be a plurality of the mounting frames 4 according to a requirement.

Figure 6:
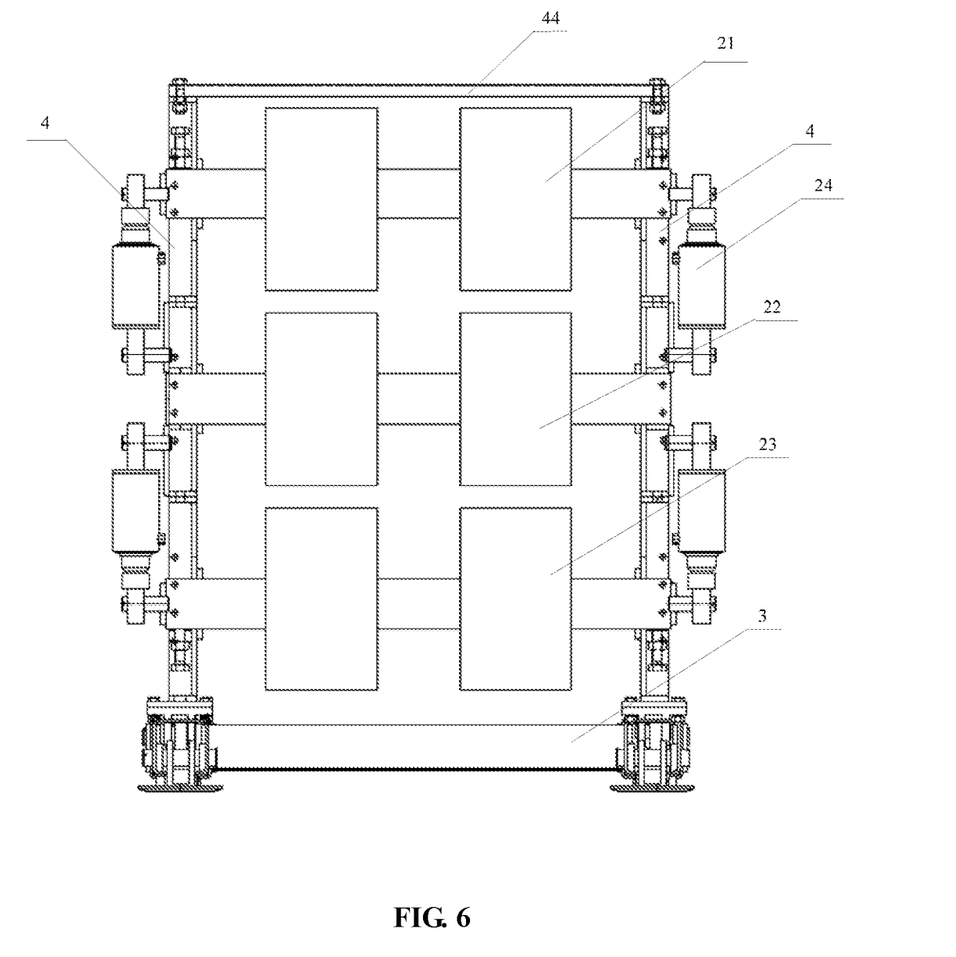
FIG. 6 is a front view of a belt conveyor according to the embodiment of the disclosure.

In an alternative embodiment, as shown in FIG. 6, the two mounting frames 4 are symmetrically arranged on the two sides of the base 3 respectively, and the two mounting frames 4 provide a support structure for the upper caterpillar disk 21, the middle caterpillar disk 22 and the lower caterpillar disk 23.

The lower caterpillar disk 23 is fixedly connected between the symmetric mounting frames 4, and the middle caterpillar disk 22 is movably connected between the symmetric mounting frames 4, and may longitudinally slide along the symmetric mounting frames 4 under a breaking of a first braking device 24, so that the lower caterpillar disk 23 and the middle caterpillar disk 22 form a first clamping device 26 configured to clamp a rubber belt; the upper caterpillar disk 21 is movably connected between the symmetric mounting frames, and may longitudinally slide along the symmetric mounting frames 4 under a breaking of a second first braking device 24, so that the upper caterpillar disk 21 and the middle caterpillar disk 22 form a second clamping device 27 configured to clamp the rubber belt. Each of the upper caterpillar disk 21, the middle caterpillar disk 22 and the lower caterpillar disk 23 is provided with a driving part 50 configured to drive a caterpillar track into rolling.

The upper caterpillar disk 21, the middle caterpillar disk 22 and the lower caterpillar disk 23 are symmetrically distributed in vertical direction, so that the first clamping device 26 and the second clamping device 27 may better clamp the rubber belt.

For enabling the upper caterpillar disk 21 and the middle caterpillar disk 22 both to longitudinally slide along the mounting frames 4, multiple sliding mechanisms, for example, rails, sliding rails or guide rails, may be longitudinally and symmetrically arranged on inner sides of the two mounting frames 4. Correspondingly, corresponding sliding parts are arranged on two sides of both the upper caterpillar disk 21 and the middle caterpillar disk 22, and then the sliding parts may longitudinally slide along the rails, the sliding rails or the guide rails. Alternatively, multiple sliding slots, guide grooves or the like may also be longitudinally and symmetrically formed on the inner sides of the two mounting frames 4, horizontal support posts on the two sides of the upper caterpillar disk 21 and the middle caterpillar disk 22 are placed in these sliding slots or guide grooves, and then the support posts may longitudinally slide along the sliding slots or the guide grooves. The mounting frames 4 may also be guide shafts, and the two sides of the upper caterpillar disk 21 and the middle caterpillar disk 22 are mounted over the guide shafts through guide sleeves to longitudinal sliding along the guide shafts.

The lower caterpillar disk 23 is fixedly connected between the two symmetric mounting frames 4, the releasing or pressing of the first clamping device 26 is thus regulated by longitudinal sliding of the middle caterpillar disk 22. Both the upper caterpillar disk 21 and the middle caterpillar disk 22 may longitudinally slide, and then releasing or pressing of the second clamping device 27 may be regulated by longitudinal sliding of the upper caterpillar disk 21 or the middle caterpillar disk 22.

Figure 2:
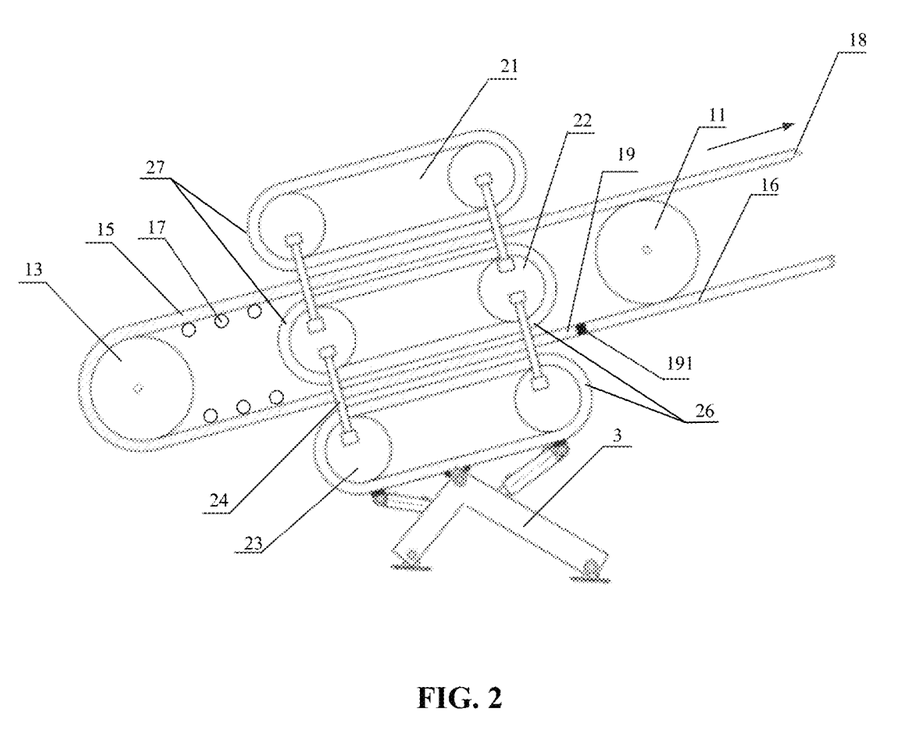
FIG. 2 is a schematic diagram of a first working state of a belt conveyor according to an embodiment of the disclosure.

FIG. 2 shows a first working state of implementing belt replacement through the rubber belt retracting and deploying device. The belt replacement includes the following steps.

In Step 1, i.e. shutdown, operation of the belt conveyor is stopped, and a power driving device is separated from the rubber belt to set the rubber belt in a free and loose state.

In Step 2, on the ground, the rubber belt is cut off at a position close to the transmission drum 11, the position where the rubber belt is cut is divided into a first end 19 and a second end 18; the rubber belt retracting and deploying device is mounted, and the first end 19 passes through the first clamping device 26, and then a new rubber belt 16 is connected with the first end 19 by virtue of a connecting device 191; the second end 18 passes through the second clamping device 27, and then the second end 18 is connected to a belt winding device. In practice, if length is insufficient, the second end 18 may be connected with a dedicated connecting belt before the connection of the second end to the belt winding device.

In Step 3, the brake of the second braking device 28 is activated in such a way that the second clamping device 27 tightly press against the second end 18, the driving part(s) 50 on the upper caterpillar disk 21 and/or the middle caterpillar disk 22 are/is activated to drive the upper caterpillar disk 21 and the middle caterpillar disk 22 into rotation, and thus the rubber belt 15 is tightened; the brake of the first braking device 24 is activated in such a way that the first clamping device 26 tightly press against the first end 19, and the rubber belt is in the tightened state at this moment.

In Step 4, the driving parts 50 on the upper caterpillar disk 21, the middle caterpillar disk 22 and the lower caterpillar disk 23 are activated to drive the upper caterpillar disk 21, the second caterpillar disk 22 and the lower caterpillar disk 23 into rotation, the rubber belt 15 is placed in the belt winding device and the new rubber belt 16 is mounted on the belt conveyor at the same time. Thus, in this step, rotating speeds of the upper caterpillar disk 21, the middle caterpillar disk 22 and the lower caterpillar disk 23 are the same, so that a combination of the rubber belt 15 and the new rubber belt 16 may be kept in the tightened state.

In Step 5, the connecting device 191 is dismounted, the rubber belt 15 is separated from the new rubber belt 16, and two ends of the new rubber belt 16 are connected in a sulfurization manner, and then a no-load trial operation is performed.

Since the rubber belt 15 is in the tightened state in step 3, the rubber belt 15 may not be closely abutted to support rollers, and the rubber belt between two support rollers is prevented from a pulled-down state, so that a frictional force is reduced to further save energy resources. Moreover, the rubber belt rolls more easily in step 4, and the gravity of part of the rubber belt moving downwards may counteract the gravity of part of rubber belt moving upwards, so that the rubber belt retracting and deploying device is only required to overcome the frictional force, and the energy resources may further be saved.

Figure 3:
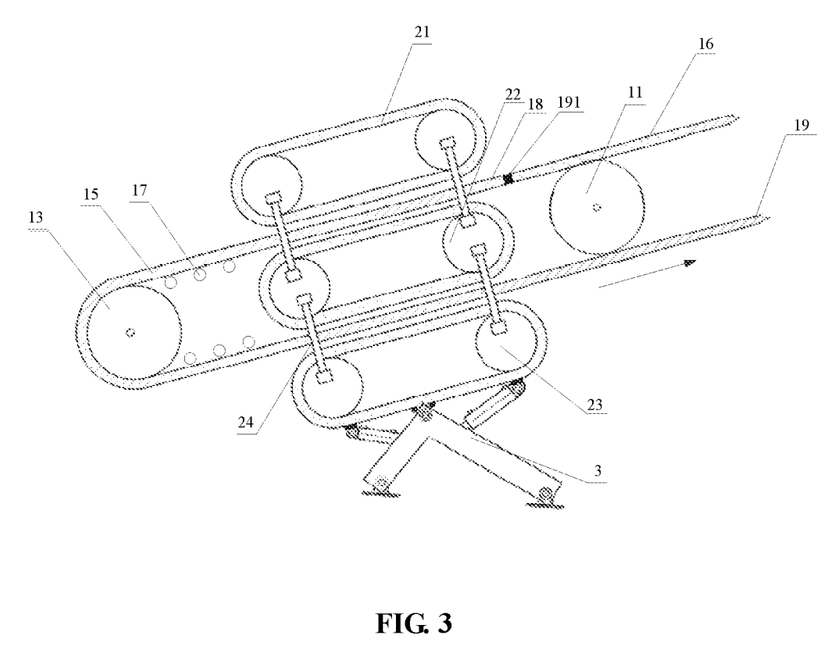
FIG. 3 is a schematic diagram of a second working state of a belt conveyor according to the embodiment of the disclosure.

FIG. 3 shows a second working state of implementing belt replacement through the rubber belt retracting and deploying device. Belt replacement steps are different from those shown in FIG. 2 in following aspects. First, Step 2 may be replaced as follows: the rubber belt is cut off at the position close to the transmission drum 11 on the ground, and the position where the rubber belt is cut off is divided into the first end 19 and the second end 18; the rubber belt retracting and deploying device is mounted, the first end 19 passes through the first clamping device 26, and then the first end 19 is connected to the belt winding device; the second end 18 passes through the second clamping device 27, and then the new rubber belt 16 is connected to the second end 18 by virtue of the connecting device 191; and in practice, if length is insufficient, the first end 19 may be connected with a dedicated connecting belt before the connection of the second end to the belt winding device. Second, Step 3 may be replaced as follows: the brake of the first braking device 24 is activated in such a way that the first clamping device 26 tightly press against the first end 19, the driving part(s) 50 on the middle caterpillar disk 22 and/or the lower caterpillar disk 23 are/is activated, and then the middle caterpillar disk 22 and the lower caterpillar disk 23 rotate to tighten the rubber belt 15; the brake of the second braking device 28 is activated in such a way that the second clamping device 27 tightly press against the second end 18, and the rubber belt is in the tightened state at this moment.

In the prior art, after the new and old rubber belts are separated from each other, the new rubber belt is in the free and loose state. Before the two ends of the new rubber belt are connected in the sulfurization manner, the new rubber belt is required to be tightened, so that it is troublesome. While in Step 5 of the embodiments of the disclosure, as shown in FIG. 2 and FIG. 3, when the rubber belt 15 and the new rubber belt 16 are separated from each other, the new rubber belt 16 is still in the tightened state, then the two ends of the new rubber belt 16 may be directly connected in the sulfurization manner, the new rubber belt 16 is thus not required to be tightened, and the rubber belt retracting and deploying device is only required to be removed and dismounted after sulfurization, so that it is relatively easy to operate.

Figure 4:
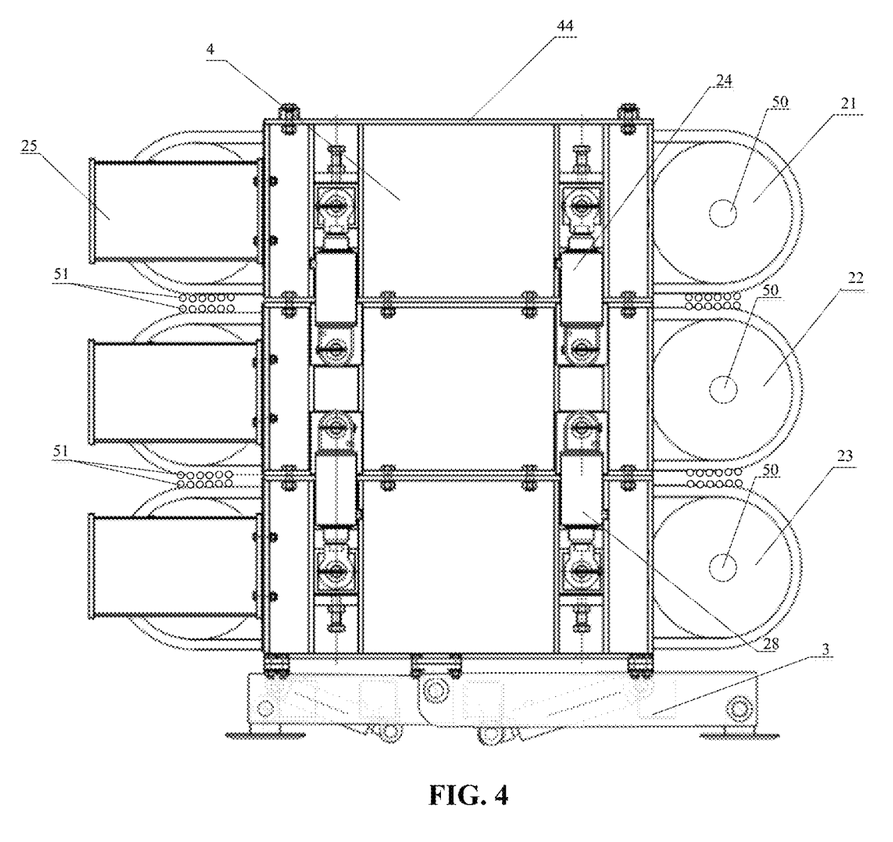
FIG. 4 is a side view of a belt conveyor according to the embodiment of the disclosure.
Figure 5:
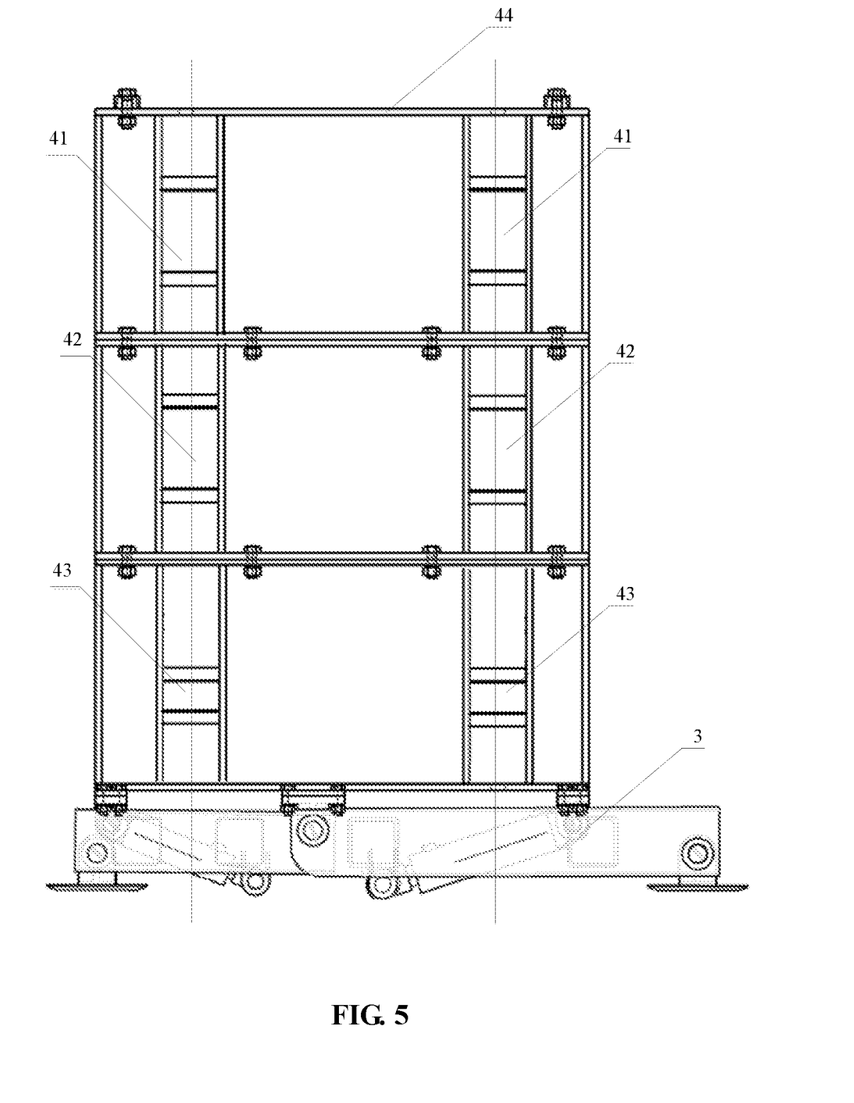
FIG. 5 is a structure diagram of a mounting frame according to the embodiment of the disclosure.

In the embodiments of the disclosure, as shown in FIG. 4, FIG. 5 and FIG. 6, horizontal support posts are fixed on both sides of the upper caterpillar disk 21, and the mounting frames 4 are longitudinally provided with upper sliding slots 41 accommodating the support posts of the upper caterpillar disk 21. Horizontal support posts are also fixed on both sides of the middle caterpillar disk 22, and the mounting frames 4 are longitudinally provided with middle sliding slots 42 accommodating the support posts of the middle caterpillar disk 22. The upper sliding slots 41 and the middle sliding slots 42 are symmetrically distributed in vertical direction.

As shown in FIG. 6, both the two mounting frames 4 are provided with the upper sliding slots 41, the horizontal support posts on the two sides of the upper caterpillar disk 21 pass through the upper sliding slots 41 respectively. In such a way, the two upper sliding slots 41 provide a support structure for the upper caterpillar disk 21, and the upper caterpillar disk 21 may longitudinally slide along the upper sliding slots 41. For preventing transverse swaying of the upper caterpillar disk 21, the support posts may be required to be matched with the upper sliding slots 41. The same for the middle caterpillar disk 22 and the middle sliding slots 42.

Since the upper sliding slots 41 and the middle sliding slots 42 are symmetrically distributed in vertical direction, the upper caterpillar disk 21 and the middle caterpillar disk 22 are also symmetrically distributed in vertical direction.

In the embodiments of the disclosure, horizontal support posts are fixed on both sides of the lower caterpillar disk 23, the mounting frames 4 are provided with positioning holes 43 through which the support posts of the lower caterpillar disk 23 pass, the support posts are fixed in the positioning holes 43 through bolts, and the positioning holes 43 and the middle sliding slots 32 are symmetrically distributed in vertical direction.

Here, since the support posts of the lower caterpillar disk 23 are fixed in the positioning holes 43 by virtue of the bolts, the lower caterpillar disk 23 may be detached from the two mounting frames for allowing convenient transportation and mounting. Since the positioning holes 43 and the middle sliding slots 42 are symmetrically distributed in vertical direction, the middle caterpillar disk 22 and the lower caterpillar disk 23 are also symmetrically distributed in vertical direction.

In the embodiments of the disclosure, the first braking device 24 may be a hydraulic oil cylinder, a piston rod of the hydraulic oil cylinders is connected to the support post of the lower caterpillar disk 23, and cylinder barrel of the hydraulic oil cylinder is connected to the support post of the middle caterpillar disk 22.

In an alternative embodiment, numbers of the support posts on the two sides of the middle caterpillar disk 22 and the lower caterpillar disk 23 are both two. Numbers of the sliding slots 42 and the positioning holes 43 for a single mounting frame 4 are also both two. Numbers of the hydraulic oil cylinders connecting the middle caterpillar disk 22 and the lower caterpillar disk 23 for a single mounting frame 4 are also both two.

In practical use, releasing or pressing of the first clamping device 26 may be controlled by regulating extension and retraction of the piston rod of the hydraulic oil cylinder between the middle caterpillar disk 22 and the lower caterpillar disk 23.

In the embodiments of the disclosure, the second braking device 28 is a hydraulic oil cylinder, piston rod of the hydraulic oil cylinder is connected to the support post of the upper caterpillar disk 21, and cylinder barrel of the hydraulic oil cylinder is connected to the support post of the middle caterpillar disk 22.

In an alternative embodiment, numbers of the support posts on the two sides of the upper caterpillar disk 21 and the middle caterpillar disk 22 are both two. Numbers of the upper sliding slots 41 and the middle sliding slots 42 for a single mounting frame 4 are also both two. Numbers of the hydraulic oil cylinders connecting the upper caterpillar disk 21 and the middle caterpillar disk 22 for a single mounting frame 4 are also both two.

In practical use, releasing or pressing of the second clamping device 27 may be controlled by regulating extension and retraction of the piston rod of the hydraulic oil cylinder between the upper caterpillar disk 21 and the middle caterpillar disk 22.

In the embodiments of the disclosure, a lower portion of the upper caterpillar disk is provided with bearing wheels 51, both an upper portion and lower portion of the middle caterpillar disk are also provided with bearing wheels 51, and an upper portion of the lower caterpillar disk is also provided with bearing wheels 51.

The upper caterpillar disk and the middle caterpillar disk are required to be cooperated with one another to tightly press against the rubber belt, so that, for achieving a better pressing effect, the bearing wheels 51 may be arranged at the lower portion of the upper caterpillar disk and the upper portion of the middle caterpillar disk. Similarly, the middle caterpillar disk and the lower caterpillar disk are required to be cooperated with one another to tightly press against the rubber belt, so that, for achieving a better pressing effect, the bearing wheels 51 may be arranged at the lower portion of the middle caterpillar disk and the upper portion of the lower caterpillar disk.

In the embodiments of the disclosure, the driving parts 50, which are arranged on the upper caterpillar disk 21, the middle caterpillar disk 22 and the lower caterpillar disk 23 and drive the caterpillar tracks into rotation, may be hydraulic motors.

Figure 7:
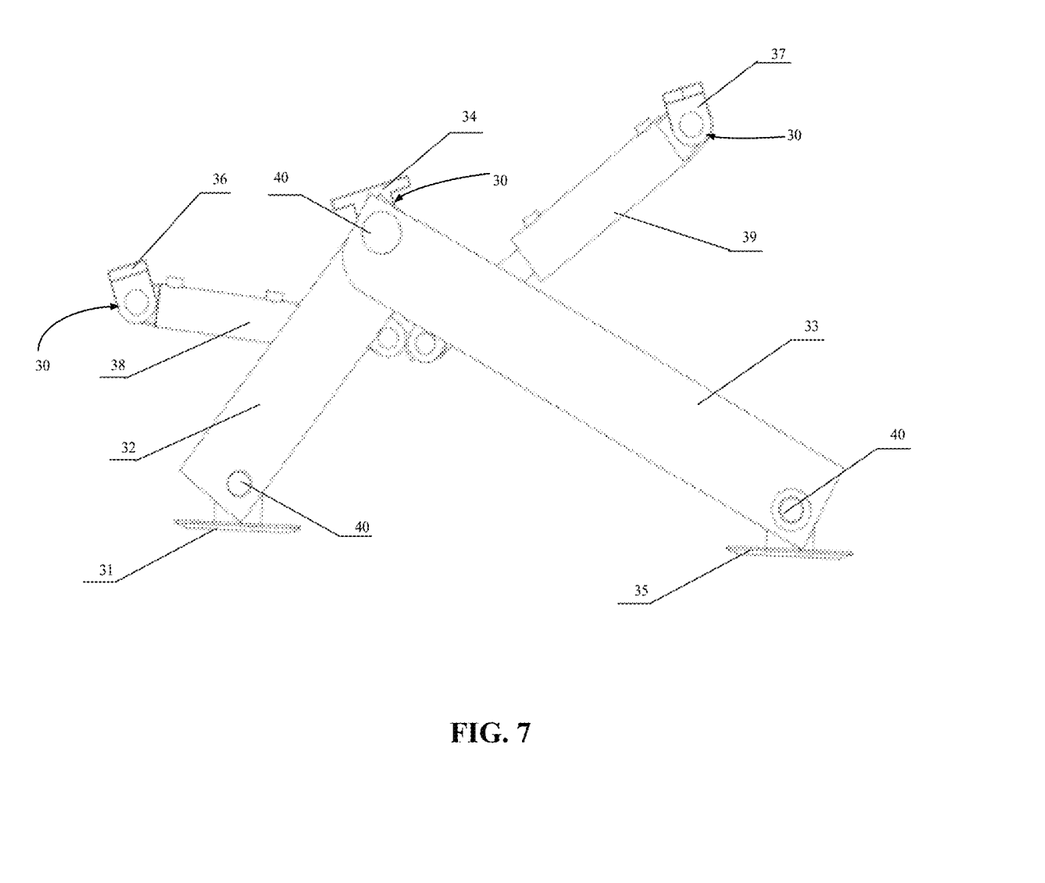
FIG. 7 is a structure diagram of a base according to the embodiment of the disclosure.

In the embodiments of the disclosure, a first end of a short support leg engaging piece and a first end of a long support leg engaging piece 33 are connected to each other through a pin shaft 40, and a third support piece 34 configured to fix the mounting frames is mounted at the connection position. A second end of the short support leg engaging piece 32 is connected with a first grounding support seat 31 through a pin shaft 40, and a second end of the long support leg engaging piece 33 is connected with a second grounding support seat 35 through a pin shaft 40.

During practical use, as shown in FIG. 7, the short support leg engaging piece 32 and the long support leg engaging piece 33 are required to be unfolded, and are supported on the ground by virtue of the first grounding support seat 31 and the second grounding support seat 35. The base 3 forms a support structure by virtue of the short support leg engaging piece 32 and the long support leg engaging piece 33. The long support leg engaging piece 33 is longer than the short support leg engaging piece 32, so that, when the long support leg engaging piece 33 and the short support leg engaging piece 32 are unfolded, an angle between the short support leg engaging piece 32 and the ground may be larger than an angle between the long support leg engaging piece 33 and the ground. Therefore, most of the gravity acting on the base may act on the short support leg engaging piece 32, and the base may be relatively stable.

For forming a more stable structure, a concrete foundation may be poured on the ground, and meanwhile, the first grounding support seat 31 and the second grounding support seat 35 are fixed on the concrete foundation.

The short support leg engaging piece 32 is connected to one end of a first hydraulic oil cylinder 38 through a pin shaft 40, and the other end of the first hydraulic oil cylinder 38 is connected with a first support piece 36 configured to fix the mounting frames through a pin shaft 40. The long support leg engaging piece 33 is connected to one end of a second hydraulic oil cylinder 39 through a pin shaft 40, and the other end of the second hydraulic oil cylinder 39 is connected with a second support piece 37 configured to fix the mounting frames through a pin shaft.

As shown in FIG. 7, three support pieces 30, i.e. the first support piece 36, the second support piece 37 and the third support piece 38, are arranged on the base, and the three support pieces 30 are used for supporting the mounting frames. Angle of the mounting frame may be regulated through the first hydraulic oil cylinder 38 and the second hydraulic oil cylinder.

As an optional solution, for convenient mounting and manufacturing, each mounting frame 4 is divided into three detachable parts from top to bottom: an upper mounting frame, a middle mounting frame and a lower mounting frame Bolts may be used for connection between the upper mounting frame and the middle mounting frame and between the middle mounting frame and the lower mounting frame. The upper sliding slots 41 through which the support posts of the upper caterpillar disk 21 pass are formed in the upper mounting frame, the middle sliding slots 42 through which the support posts of the middle caterpillar disk 22 pass are formed in the middle mounting frame, and the positioning holes 43 through which the support posts of the lower caterpillar disk 23 pass are formed in the lower mounting frame. Moreover, braking plates 25 are mounted on all of the upper mounting frame, the middle mounting frame and the lower mounting frame.

As an optional solution, for safety, a cover plate 44 fixed on the two mounting frames through bolts may be arranged above the two mounting frames.

The above is only the preferred embodiment of the disclosure and not intended to limit the scope of protection of the disclosure.

INDUSTRIAL APPLICABILITY

According to the rubber belt retracting and deploying device of the embodiments of the disclosure, in a belt replacement process, the rubber belt may be in a tightened state, and may not be closely abutted to support rollers, and the rubber belt between two support rollers is prevented from a pulled-down state, so that a frictional force may be reduced. Furthermore, with reduction of the frictional force, the rubber belt may move more easily, and the gravity of part of the rubber belt moving downwards may counteract the gravity of part of rubber belt moving upwards, so that the rubber belt retracting and deploying device of the embodiments of the disclosure is only required to overcome the frictional force to complete rubber belt. In such a way, the rubber belt retracting and deploying device of the embodiments of the disclosure may significantly save energy resources.

The invention claimed is:

1. A rubber belt retracting and deploying device for a belt conveyor, comprising a base, mounting frames, an upper caterpillar disk, a middle caterpillar disk and a lower caterpillar disk, wherein the mounting frames are symmetrically fixed on two sides of the base; all of the upper caterpillar disk, the middle caterpillar disk and the lower caterpillar disk are transversely arranged between the symmetric mounting frames, and are symmetrically distributed in vertical direction;

the lower caterpillar disk is fixedly connected between the symmetric mounting frames, the middle caterpillar disk is movably connected between the symmetric mounting frames and longitudinally slide along the symmetric mounting frames under a breaking of a first braking device, so that the lower caterpillar disk and the middle caterpillar disk form a first clamping device configured to clamp a rubber belt; the upper caterpillar disk is movably connected between the symmetric mounting frames and longitudinally slide along the symmetric mounting frames under a breaking of a second braking device, so that the upper caterpillar disk and the middle caterpillar disk form a second clamping device configured to clamp the rubber belt; and each of the upper caterpillar disk, the middle caterpillar disk and the lower caterpillar disk is provided with a driving part configured to drive a caterpillar track into rolling.

2. The rubber belt retracting and deploying device for the belt conveyor according to claim 1, wherein horizontal support posts are fixed on both sides of the upper caterpillar disk, and the mounting frames are longitudinally provided with upper sliding slots accommodating the support posts of the upper caterpillar disk; horizontal support posts are fixed on both sides of the middle caterpillar disk, and the mounting frames are longitudinally provided with middle sliding slots accommodating the support posts of the middle caterpillar disk; and the upper sliding slots and the middle sliding slots are symmetrically distributed in vertical direction.

3. The rubber belt retracting and deploying device for the belt conveyor according to claim 2, wherein horizontal support posts are fixed on both sides of the lower caterpillar disk, the mounting frames are provided with positioning holes through which the support posts of the lower caterpillar disk pass, the support posts are fixed in the positioning holes through bolts, and the positioning holes and the middle sliding slots are symmetrically distributed in vertical direction.

4. The rubber belt retracting and deploying device for the belt conveyor according to claim 3, wherein the first braking device is a hydraulic oil cylinder, piston rod of the hydraulic oil cylinder is connected to the support post of the lower caterpillar disk, and cylinder barrel of the hydraulic oil cylinder is connected to the support post of the middle caterpillar disk.

5. The rubber belt retracting and deploying device for the belt conveyor according to claim 2 or 3, wherein the second braking device is a hydraulic oil cylinder, piston rod of the hydraulic oil cylinder is connected to the support post of the upper caterpillar disk, and cylinder barrel of the hydraulic oil cylinders is connected to the support post of the middle caterpillar disk.

6. The rubber belt retracting and deploying device for the belt conveyor according to claim 1, wherein a lower portion of the upper caterpillar disk is provided with bearing wheels, both an upper portion and lower portion of the middle caterpillar disk are also provided with bearing wheels, and an upper portion of the lower caterpillar disk is also provided with bearing wheels.

7. The rubber belt retracting and deploying device for the belt conveyor according to claim 1, wherein the driving parts driving the caterpillar tracks into rolling are hydraulic motors.

8. The rubber belt retracting and deploying device for the belt conveyor according to claim 1, wherein the base comprises a short support leg engaging piece, a long support leg engaging piece and support pieces;

a first end of the short support leg engaging piece and a first end of the long support leg engaging piece are connected to each other through a pin shaft, and the third support piece configured to fix the mounting frames is mounted at the connection position; a second end of the short support leg engaging piece is connected with a first grounding support seat through a pin shaft, and a second end of the long support leg engaging piece is connected with a second grounding support seat through a pin shaft;

the short support leg engaging piece is connected to one end of a first hydraulic oil cylinder through a pin shaft, and the other end of the first hydraulic oil cylinder is connected with the first support piece configured to fix the mounting frames through a pin shaft; and the long support leg engaging piece is connected to one end of a second hydraulic oil cylinder through a pin shaft, and the other end of the second hydraulic oil cylinder is connected with the second support piece configured to fix the mounting frames through a pin shaft.

9. The rubber belt retracting and deploying device for the belt conveyor according to claim 3, wherein the second braking device is a hydraulic oil cylinder, piston rod of the hydraulic oil cylinder is connected to the support post of the upper caterpillar disk, and cylinder barrel of the hydraulic oil cylinders is connected to the support post of the middle caterpillar disk.

* * * * *